Figure 4:
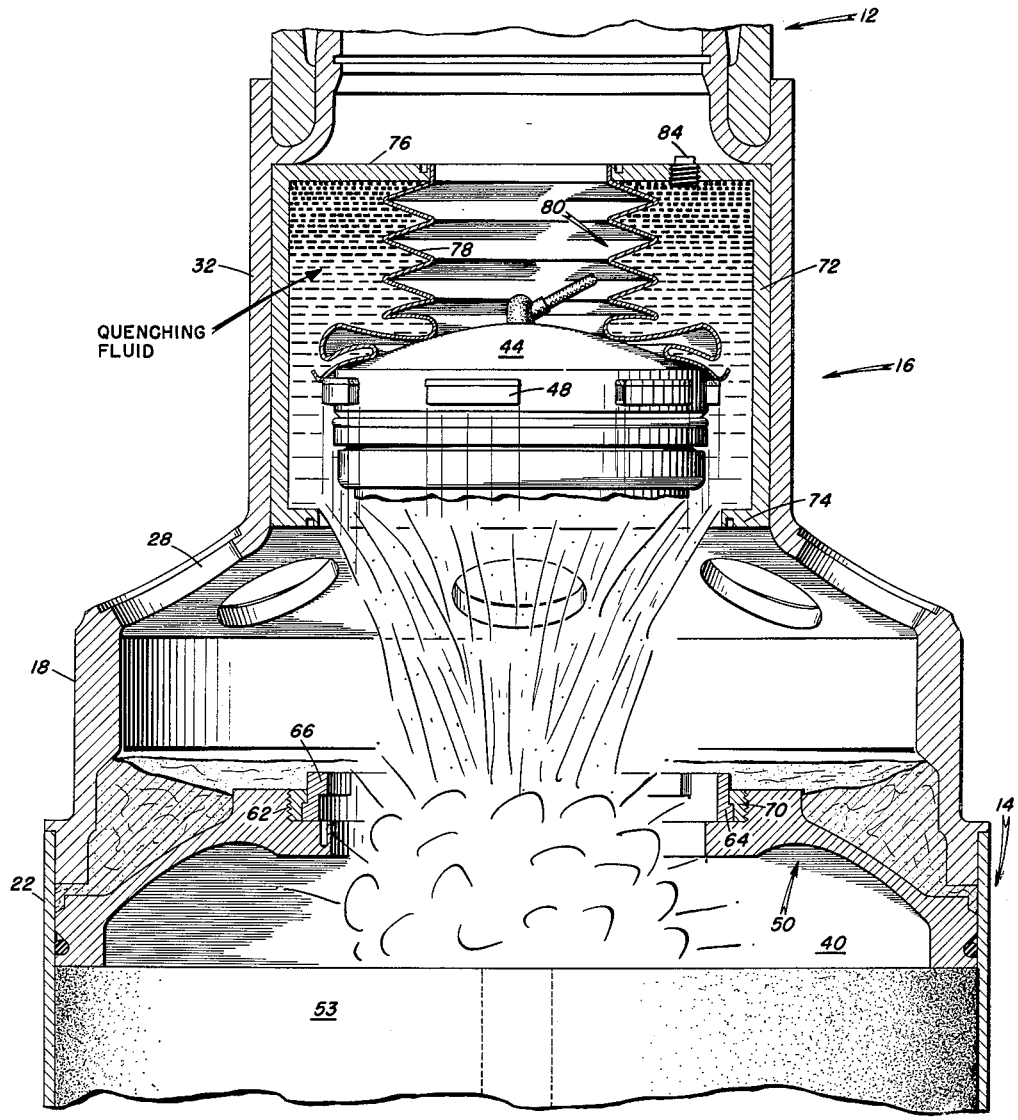

April 9, 1963   J. F. R. FLOYD ETAL   3,084,506
FIRE EXTINGUISHER FOR A ROCKET MOTOR
Filed April 6, 1961   4 Sheets-Sheet 1
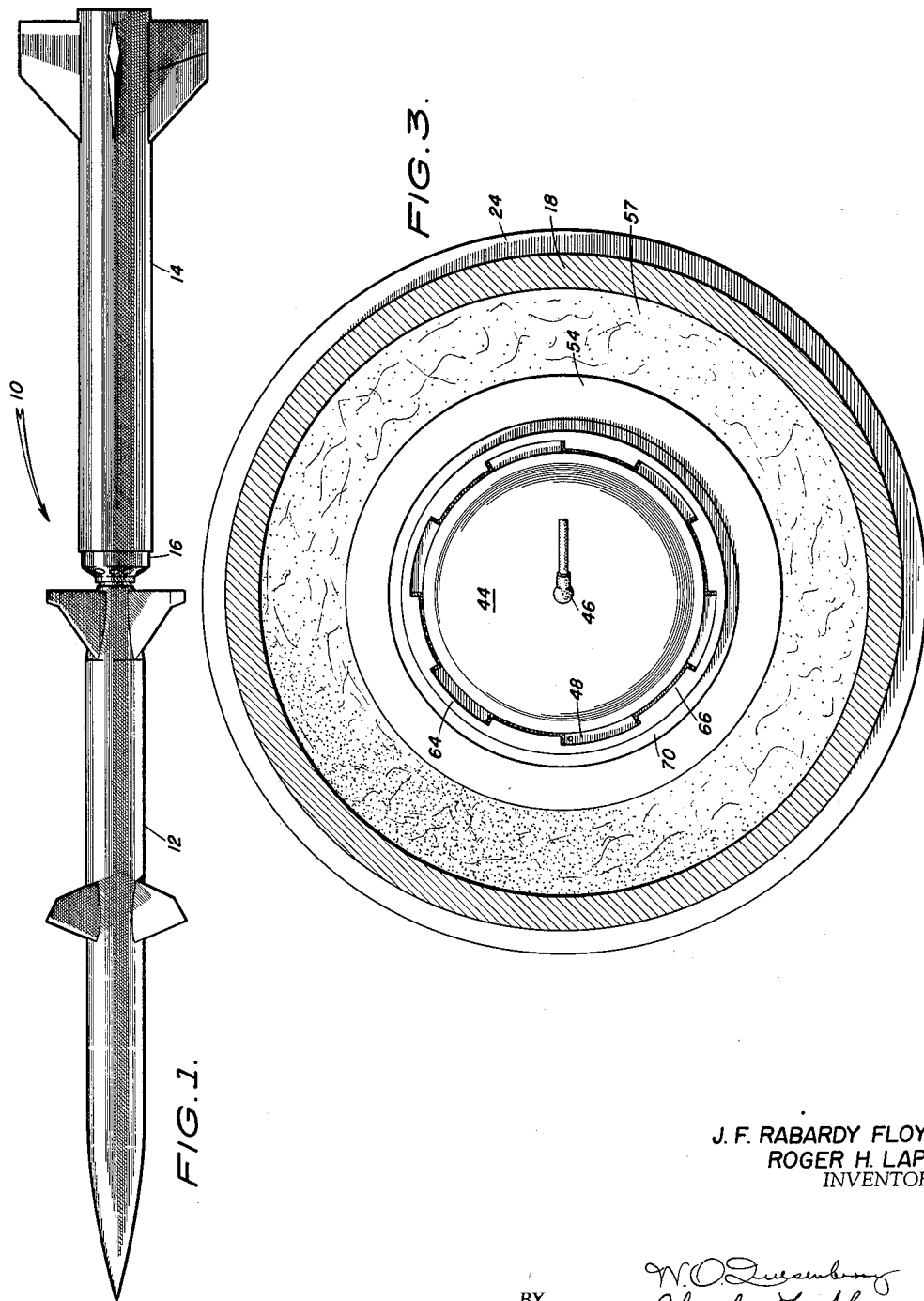
J. F. RABARDY FLOYD
ROGER H. LAPP
INVENTORS
BY W. O. Quesenberry
Claude Funkhouser
ATTORNEYS

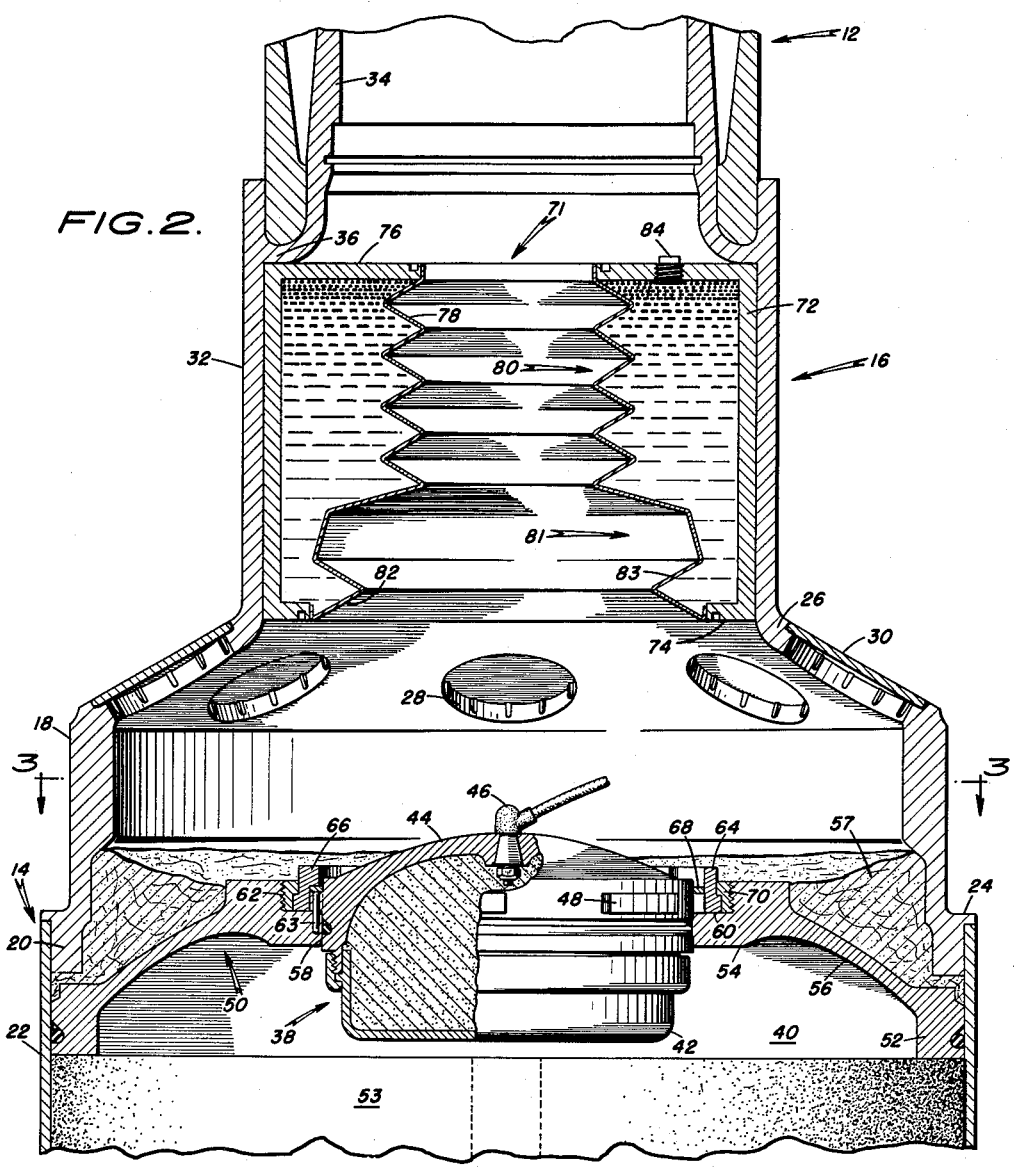

J. F. RABARDY FLOYD
ROGER H. LAPP
INVENTORS

United States Patent Office 3,084,506
Patented Apr. 9, 1963

3,084,506
FIRE EXTINGUISHER FOR A ROCKET MOTOR
J. F. Rabardy Floyd and Roger H. Lapp, Silver Spring, Md., assignors to the United States of America as represented by the Secretary of the Navy
Filed Apr. 6, 1961, Ser. No. 101,309
12 Claims. (Cl. 60—35.6)

The present invention relates generally to fire extinguishers; more particularly, it relates to a fire extinguisher for use in a booster rocket.

Missiles stowed on shipboard must be closely spaced due to the limited size of the storage area. Because it may be necessary to reload the automatic missile launcher at a fast rate during battle, missiles employing dual stage rockets are required to be stowed in assembled condition. For safety reasons, booster or first stage rockets are stored in a nonpropulsive state until just prior to launching. The term "nonpropulsive," as used in this application, refers to a rocket which when ignited delivers a substantially equal thrust both forward and aft, thus causing the rocket to remain stationary when stowed. Inadvertent ignition of a nonpropulsive rocket due to human error or enemy action can cause serious damage to adjacent rockets and to the missile storage area and can be potentially dangerous to the ship's personnel.

One method of reducing the hazards involved in this type of storage is to provide means for extinguishing combustion in the propellant grain of a nonpropulsive booster rocket. An ordinary sprinkler system installed in the storage area would react to slowly to be effective, since the burning of a propellant grain may last for only a few seconds. It is necessary, therefore, to provide each individual booster with a fire extinguishing device which will react very rapidly to inadvertent ignition of the grain. To avoid the installation of a high pressure water system in the missile storage area, it is desirable to provide each missile with a self-contained fire extinguisher. Such an extinguisher should be light in weight, easy to maintain in operative condition, and should be designed for use with existing rocket equipment.

A problem closely related to extinguishing combustion in a nonpropulsive booster rocket is that of thrust termination of a rocket during flight. Termination of thrust affects the range and speed of a missile and can be used to aid in controlling its flight. By actuating the fire extinguisher of the present invention during flight upon command from a ground control station, combustion in the propellant grain can be extinguished to terminate the rocket thrust.

It is an object of the present invention to provide a nonpropulsive booster rocket with a self-contained fast-acting fire extinguisher independent of any external water supply system.

Another object of the invention is to provide an efficient self-contained fire extinguisher which is simple in construction and can be mounted in existing equipment necessitating but a minimum of modification thereof.

A further object of the invention is to provide a fire extinguisher containing a relatively small quantity of fire quenching fluid, but still an amount sufficient to extinguish combustion in the propellant grain of a rocket.

Yet another object is to provide a self-contained, fast-acting fire extinguisher having signal responsive actuating means for terminating thrust in a booster rocket during flight.

Figure 5:
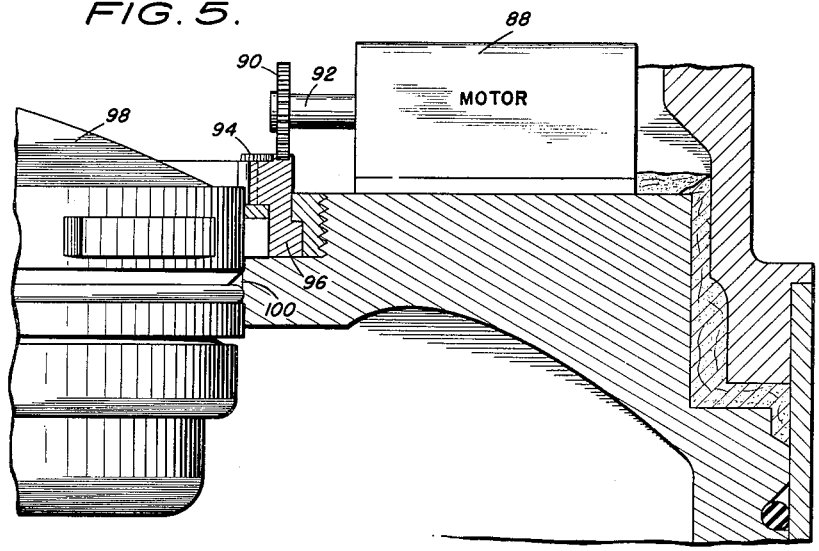
Figure 6:
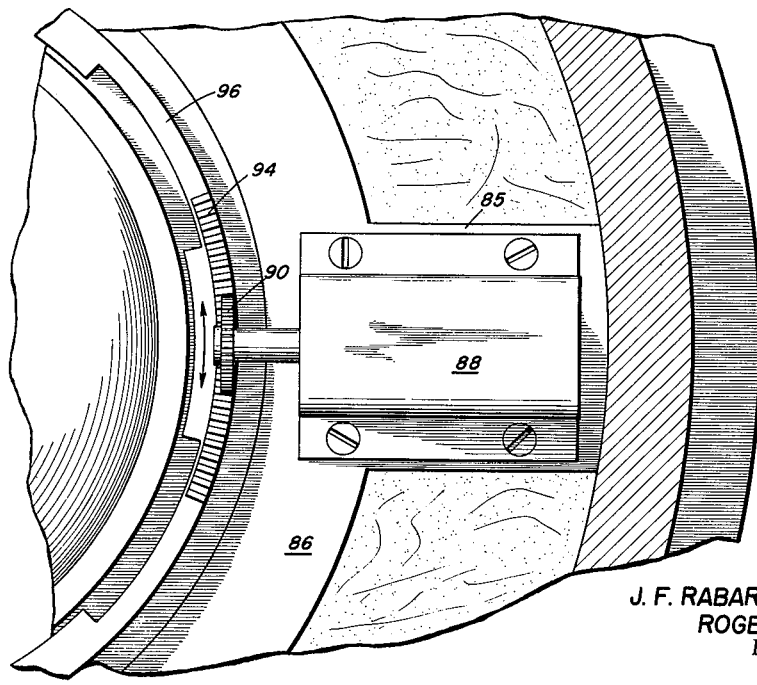

Other objects and many of the attendant advantages of the present invention will be readily appreciated as the same becomes better understood by reference to the following detailed description when considered in connection with the accompanying drawings, wherein:

FIG. 1 shows a missile round embodying the device of the present invention;
FIG. 2 is a detail section through the longtiudinal axis of the booster adapter ring of a nonpropulsive rocket, showing the fire extinguishing device of the present invention installed therein;
FIG. 3 is a section taken on line 3—3 of FIG. 2, omitting the shear washer for purposes of clarity;
FIG. 4 is a view similar to FIG. 2 but showing the fire extinguisher during actuation thereof;
FIG. 5 is a partial detail section of a modified igniter base locking assembly for use in thrust termination; and
FIG. 6 is a plan view of the structure shown in FIG. 5.

The invention generally comprises a frangible collapsible tank mounted in the interior of a booster rocket adapter ring and containing a fire quenching fluid such as water. The tank is longitudinally aligned with the igniter of the booster rocket. Inadvertent ignition of the igniter or the propellant grain of a nonpropulsive booster rocket will cause the igniter base to be forcibly expelled from the rocket forward head assembly into contact with the tank to open and collapse the same, thereby releasing the fluid contained therein and forcibly directing it into the rocket chamber.

By means of a slight modification, the same device can be used to effectively terminate the thrust of a rocket during flight. A signal responsive device is provided to unlock the igniter base upon command from a ground control station. The pressure within the rocket chamber created by the burning propellant will act to force the unlocked base against the tank as described above. This release of the igniter base will cause a sudden change in the vent area of the rocket chamber which will reduce the pressure therein and change the burning rate of the propellant such that on some occasions combustion will cease. The quenching fluid released from the tank aids in extinguishing combustion in the propellant.

Referring to the drawings, a missile round 10 is shown in FIG. 1, and comprises a missile 12 and a booster rocket 14 connected by a booster rocket adapter ring 16.

As shown in FIG. 2, the adapter ring 16 is of unitary construction and includes a cylindrical section 18. The aft end of section 18 is integral with a sleeve 20 of slightly greater diameter, which is fitted into the forward end of the casing 22 of booster rocket 14 and fastened thereto by any suitable means. An annular flange 24 extends radially outwardly of the forward end of the sleeve 20 and abuts the forward end of the casing 22 to limit the insertion of the adapter ring 16 into said casing.

A frusto-conical section 26 extends radially inwardly from the forward end of the cylindrical section 18 and contains a plurality of circumferentially spaced circular vents 28 having blow-out covers 30. Integral with the frusto-conical section 26 is an elongated cylindrical section 32, the forward end of which surrounds the aft end of the missile 12. A radially inwardly directed frusto-conical section 34 is connected to the cylindrical section 32 adjacent the forward end thereof by a shoulder 36 extending radially inwardly from said cylindrical section. The frusto-conical section 34 fits within the aft end of missile 12 and is secured thereto by any suitable means.

An igniter 38 is provided at the forward end of the combustion chamber 40 of booster rocket 14, and comprises a cup-shaped holder 42, made of thin metal or plastic, positioned coaxially of said rocket with the open end of the holder facing forward. A cup-shaped igniter base 44 of substantially the same inside diameter as holder 42 is threadedly secured to said holder with the open end of the base 44 facing aft, to form a closed container for housing igniter material therein. The igniter base 44 has an arcuate forward end wall in the center of which an electrically actuated detonating terminal 46 is fixed. A plurality of equally spaced teeth or lugs 48 extend radially from the outer periphery of the base for locking it, as described more fully hereinafter.

Positioned in the forward end of the booster rocket 14 and separating the combustion chamber 40 from adapter ring 16 is an integral rocket forward head assembly 50 comprising an outer annulus 52 abutting the forward end of a solid propellant grain 53, an inner annulus 54 positioned forward of outer annulus 52, and an arcuate section 56 joining the inner and outer annuli. The space between the adapter ring 16, the rocket casing 22, and the arcuate section 56 is filled with a mastic compound 57 sloping radially inwardly for a purpose described hereinafter. The inner annulus 54 is provided with a central bore 58 which snugly receives the igniter base 44. An annular shoulder 60 connects the bore 58 with a threaded counterbore 62 and the lugs 48 of igniter base 44 lie on the inner portion of said shoulder. Relative rotation between the igniter base 44 and the rocket head assembly 50 is prevented by doweling one or more of the lugs 48 to the inner annulus 54 as indicated at 63. A locking ring 64 is slidably positioned on shoulder 60 adjacent the lugs 48 and is provided with a plurality of radially inwardly directed equally spaced teeth or lugs 66 overlying the lugs 48. The number of lugs 66 is equal to the number of lugs 48 so that when the lugs 66 overlie the spaces between the lugs 48, the igniter base will be in unlocked condition as shown in FIG. 3, and when the lugs 66 and 48 are aligned, the base 44 will be in locked condition. A shear washer 68 is positioned between the lugs 66 and 48 to hold the igniter base 44 in place when in unlocked condition. Threaded in the counterbore 62 is a threaded ring 70 provided with an inwardly directed shoulder engaging an outwardly directed shoulder on the locking ring 64 to hold the locking ring in place, while still permitting slidable rotation thereof. Suitable seals are provided between the casing 22, the rocket forward head assembly 50, and the igniter base 44 to seal the rocket chamber 40 from the adapter ring 16.

Fitted within the elongated cylindrical section 32 of adapter ring 16 is a tank 71 comprising a cylindrical outer wall 72, an annular aft wall 74, and an annular forward wall 76 extending a greater distance radially inwardly than said aft wall. The inner wall 78 of the tank 71 is generally cylindrical in shape and relatively thin, comprising a series of frusto-conical sections forming a bellows configuration. The inner wall 78 is divided into a forward piston section 80, formed of frusto-conical sections of equal size, and an aft opener section 81, formed of frusto-conical sections so arranged as to generally conform to the arcuate surface of the igniter base 44 upon being collapsed by said base. The aft frusto-conical section 82 and the adjacent section 83 are of equal size and angle to permit equal and simultaneous displacement thereof as the tank is sheared open, thus minimizing fluid resistance to the opening and collapsing of these sections. The ends of the wall 78 are fastened as by soldering to the forward and aft walls 76 and 74 respectively. The aft wall 74 should extend radially inwardly no farther than to a vertical plane passing through the outer surface of the lugs 48 of igniter base 44. The forward wall 76 is provided with a vented cap 84 threadedly secured in a mating hole through which the tank 71 may be filled.

In operation, the booster rocket is stored in nonpropulsive condition, that is, with the igniter base 44 unlocked. Inadvertent ignition of the igniter 38 or the propellant grain 53 will produce exhaust gases which build up the pressure in the rocket combustion chamber 40, until it is great enough to forcibly expel the igniter base toward the tank 71, shearing the washer 68. The holder 42 is shattered by the blast from the igniter material. The momentum of the igniter base 44 is such that the lugs 48 will shear the soldered connection between the tank inner wall 78 and the aft wall 74 and collapse the opener section 81 to force fluid from the tank as shown in FIG. 4. Continued movement of the igniter base will collapse the piston section 80 to force the remainder of fluid from the tank. The fluid is forced downwardly from the tank toward the bore 58 and any fluid splashed toward the cylindrical section 18 will be funnelled by the mastic compound 57 toward said bore to flow into the rocket chamber 40 and extinguish combustion in the propellant grain. This entire process from the time of inadvertent ignition to the quenching of the combustion lasts for only a fraction of a second.

The tank 71 is positioned above the vents 28 to allow much of the initial surge of exhaust gases accompanying the expulsion of the igniter base 44 to eject the blow-out covers 30 and exhaust to the atmosphere. If the vents were not provided, the exhaust gas pressure would hinder the escape of fluid from the tank 71 and could prevent an adequate amount of water from entering the bore 50 to flow to the rocket combustion chamber. The spacing of the igniter 38 and the tank 71 can be adjusted to vary the time of arrival of quenching fluid at the bore 58 after expulsion of the igniter base.

With a slight modification of the fire extinguisher described above, it can be used to terminate the thrust of a rocket during flight. Referring to FIGS. 5 and 6, the rocket head assembly and igniter shown therein are similar to the assembly 50 and igniter 38 described in connection with FIGS. 2–4 except for the addition of a support base 85 integrally formed with the rocket head assembly and comprising a radially outward continuation of a portion of the inner annulus 86. Mounted on the support base 85 and the inner annulus 86 is an electric motor 88 responsive to a signal from a ground control station. A pinion 90 is mounted on the end of a shaft 92 driven by the motor 88 and meshes with a gear rack 94 provided on the forward surface of the locking ring 96.

During flight, the igniter base 98 is held in locked position so that the exhaust gases from the burning propellant grain will flow toward the aft end of the rocket and out the exhaust nozzle thereof. Upon receiving a signal from a ground control station, the motor 88, through pinion 90 and rack 94, will cause the locking ring 96 to rotate until the lugs thereof are aligned with the spaces between the igniter base lugs. The exhaust gases will then hurl the igniter base 98 against the tank, as previously described to shear and collapse the bellows, forcing the fluid in the tank toward the burning propellant grain. The escape of exhaust gases through the bore 100 and out of the vents in the adapter ring will substantially reduce the propellant burning rate and equalize the thrust of the gases escaping from the exhaust nozzle of the rocket to cause the resultant rocket thrust to approximate zero. The combined action of the quenching fluid and the venting of exhaust gases effectively terminates the forward thrust of the booster rocket.

It should be understood that the above-described motor and gear means for rotating the igniter locking ring during flight are disclosed for illustrative purposes only. It is apparent that other equivalent means could be provided for rotating the ring, provided that such means be responsive to a signal from a ground control station.

In view of the foregoing disclosure, it should now be appreciated that the present invention provides a simple and efficient means for extinguishing fire in a nonpropulsive booster rocket or for terminating thrust of a rocket during flight. Obviously, many other modifications and variations of the present invention are possible in the light of the above teachings. It should therefore be understood that within the scope of the appended claims the invention may be practiced otherwise than as specifically described.

What is claimed is:

1. A fire extinguisher for a booster rocket, comprising a rocket casing having a solid propellant and an igniter therein, a cylindrical adapter connected to the forward end of said casing, and means mounted in said adapter and containing a fire quenching fluid, said igniter being mounted in the forward end of said casing, exhaust gases generated by ignition of said igniter or of said solid propellant forcing said igniter into engagement with said means for releasing the fluid, whereby the ignited propellant and igniter will be quenched.

2. A fire extinguisher for a booster rocket, comprising a rocket casing having a solid propellant and an igniter therein, a cylindrical adapter connected to the forward end of said casing, said adapter having a plurality of vents therein, and a tank having a collapsible wall and being mounted in the adapter forward of said vents and containing a fire quenching fluid, said igniter being mounted in the forward end of said rocket casing, exhaust gases generated by the ignition of said igniter or of said solid propellant forcing said igniter into engagement with said collapsible wall for collapsing the same and releasing fluid from said tank, whereby the ignited propellant and the igniter will be quenched, said vents releasing excess gas pressure from the adapter to permit free flow of fluid toward the igniter and propellant.

3. A fire extinguisher for a booster rocket, comprising a rocket casing having a solid propellant and an igniter therein, a cylindrical adapter connected to the forward end of said casing, an annular tank mounted in said adapter concentric with the longitudinal axis of said rocket and containing a fire quenching fluid, said tank including an inner wall of bellows configuration with its lower end displaceably connected to the aft end of said tank, and an igniter base mounted in the forward end of said rocket casing facing the aft end of said tank, exhaust gases created by ignition of said solid propellant or of said igniter forcing said igniter base into engagement with said displaceable connection for displacing the same and releasing fluid from said tank, whereby the ignited propellant and the igniter will be quenched.

4. A fire extinguisher for a booster rocket, comprising a rocket casing having a solid propellant, an integral rocket forward head assembly, and an igniter therein, said igniter being mounted on said assembly, a cylindrical adapter connected to the forward end of said casing, and a tank having a collapsible wall and being mounted in said adapter and containing a fire quenching fluid, said igniter having a base facing said tank, exhaust gases created by ignition of said solid propellant or of said igniter forcing said igniter base against said tank to collapse the collapsible wall thereof for forcibly ejecting the fluid from said tank.

5. A fire extinguisher for a booster rocket, comprising a rocket casing having a solid propellant, an integral rocket forward head assembly, and an igniter therein, said igniter being mounted on said assembly, a cylindrical adapter connected to the forward end of said casing, and a tank mounted in said adapter and containing a fire quenching fluid, said tank having a displaceable portion at the aft end thereof, said igniter having a base facing the aft end of said tank, exhaust gases created by ignition of said solid propellant or of said igniter forcing said igniter base against the displaceable portion of said tank to open the same and release the fluid therefrom for quenching the propellant and the igniter.

6. A fire extinguisher for a booster rocket, comprising a rocket casing having a solid propellant, an integral rocket forward head assembly, and an igniter therein, said igniter being mounted on said assembly, a cylindrical adapter connected to the forward end of said casing, and an annular tank mounted in said adapter and containing a fire quenching fluid, said tank including an inner wall of bellows configuration with its aft end displaceably connected to the aft end of said tank, said igniter having a base facing the aft end of said tank, exhaust gases created by ignition of said solid propellant or of said igniter forcing said igniter base against said tank to break the displaceable connection and collapse said inner wall to expel the fluid from said tank, whereby said fluid will flow aft for quenching the propellant and the igniter.

7. A fire extinguisher for a booster rocket as recited in claim 6, wherein the cylindrical adapter has a plurality of vents and the tank is mounted in said adapter forward of said vents, whereby the exhaust gas pressure is partially dissipated to prevent said pressure from impeding flow of fluid from said tank.

8. A fire extinguisher for a booster rocket as recited in claim 6, wherein said igniter has a cup-shaped holder positioned coaxially of said rocket and a cup-shaped igniter base threadedly secured to said holder, said igniter base having a plurality of teeth, said integral rocket forward head assembly includes a threaded counterbore, and the means for mounting said igniter on said assembly includes a dowel for preventing relative rotation between said igniter base and said assembly, a shear washer, a locking ring having a plurality of lugs, said lugs and teeth being disengaged in unlocked position, and a threaded ring secured to said counterbore for holding said locking nut against said assembly, and said shear washer holding the igniter on said assembly while in its unlocked position.

9. A fire extinguisher for terminating thrust of a rocket during flight, comprising a rocket casing having a solid propellant and an integral rocket forward head assembly therein, said assembly having a threaded counterbore, a cylindrical adapter connected to the forward end of said casing, a tank having a collapsible wall and being mounted in said adapter and containing a fire quenching fluid, an igniter having a plurality of teeth, a dowel for preventing relative rotation between said igniter and said assembly, a shear washer, a locking ring having a plurality of lugs, said lugs and teeth being positioned for interlocking engagement, said locking ring additionally having a gear rack provided on its forward surface, said teeth being separated from said lugs by said shear washer, a threaded ring secured in said counterbore for holding said locking ring against said assembly in its locked position, said means separating the solid propellant from said tank and being normally locked in position, and means responsive to a signal for rotating said locking ring and moving said lugs and teeth from their interlocking position and unlocking said separating means, exhaust gases from the burning propellant forcing said means against said tank to collapse the collapsible wall thereof for forcibly ejecting the fluid therefrom.

10. A fire extinguisher for terminating thrust of a rocket during flight, comprising a rocket casing having a solid propellant and an integral rocket forward head assembly therein, said assembly having a threaded counterbore, a cylindrical adapter connected to the forward end of said casing, a tank mounted in said adapter and containing a fire quenching fluid, said tank having a displaceable portion at the aft end thereof, an igniter having a plurality of teeth, a dowel for preventing relative rotation between said igniter and said assembly, a shear washer, a locking ring having a plurality of lugs, said lugs and teeth being positioned for interlocking engagement, said locking ring additionally having a gear rack provided on its forward surface, said teeth being separated from said lugs by said shear washer, a threaded ring secured in said counterbore for holding said locking ring against said assembly in its locked position, said means separating the solid propellant from said tank and being normally locked in position, and means responsive to a signal for rotating said locking ring and moving said lugs and teeth from their interlocking position and unlocking said separating means, exhaust gases from the burning propellant forcing said means against the displaceable portion of said tank to open the displaceable portion thereof and release the fluid therefrom.

11. A fire extinguisher for terminating thrust of a rocket during flight, comprising a rocket casing having a solid propellant, an integral rocket forward head assembly having a threaded counterbore and an igniter therein, a cylindrical adapter connected to the forward end of said rocket casing, said adapter having a plurality of vents therein, an annular tank mounted in said adapter forward of said vents and containing a fire quenching fluid, said tank including a collapsible inner wall of bellows configuration displaceably connected to the aft end of said tank, said igniter having a plurality of teeth, a dowel for preventing relative rotation between said igniter and said assembly, a shear washer, a locking ring having a plurality of lugs, said lugs and teeth being positioned for interlocking engagement, said locking ring additionally having a gear rack provided on its forward surface, said teeth being separated from said lugs by said shear washer, a threaded ring threadedly secured to said counterbore for holding said locking ring against said assembly in its locked position, said igniter having a base facing the aft end of said tank, and means responsive to a signal for rotating said locking ring and moving said lugs and teeth from their interlocking position and unlocking said igniter base, exhaust gases from the burning propellant forcing said igniter base against the tank to break the displaceable connection and collapse said inner wall to expel the fluid from said tank.

12. A fire extinguisher for terminating thrust of a rocket during flight, comprising a rocket casing having a solid propellant, an integral rocket forward head assembly having a threaded counterbore, an igniter therein, a cylindrical adapter connected to the forward end of said rocket casing, said adapter having a plurality of vents therein, an annular tank mounted in said adapter forward of said vents and containing a fire quenching fluid, said tank including a collapsible inner wall of bellows configuration displaceably connected to the aft end of said tank, said igniter having a plurality of teeth, a dowel preventing relative rotation between said igniter and said assembly, a shear washer, a locking ring having a plurality of lugs, said locking ring additionally having a gear rack, said lugs and teeth being positioned for interlocking engagement and separated by said shear washer, a threaded ring secured to said counterbore holding said locking ring against said assembly in its locked position, said normally locked igniter having a base facing the aft end of said tank, and a motor responsive to a signal from a remote point and operatively connected to said ring for rotating said locking ring and moving said lugs and teeth from their position of engagement unlocking said igniter base, whereby the unlocking of said igniter base will permit exhaust gases from the burning propellant to force said igniter base against the tank to shear the connection of the same and collapse said inner wall to expel the fluid from said tank.

References Cited in the file of this patent
UNITED STATES PATENTS

| | | |
|---|---|---|
| 2,808,114 | Parker et al. | Oct. 1, 1957 |
| 2,871,658 | Keck | Feb. 13, 1959 |
| 2,949,009 | D'Ooge | Aug. 16, 1960 |
| 2,988,879 | Wise | June 20, 1961 |